3,524,983
PROCESS AND APPARATUS FOR DETERMINING
THE CURE CHARACTERISTICS OF MATERIALS
Frederick L. Voelz, Orland Park, Ill., assignor to Sinclair
 Research, Inc., New York, N.Y., a corporation of
 Delaware
Filed Sept. 28, 1966, Ser. No. 582,753
Int. Cl. H01j 37/00
U.S. Cl. 250—43.5    8 Claims

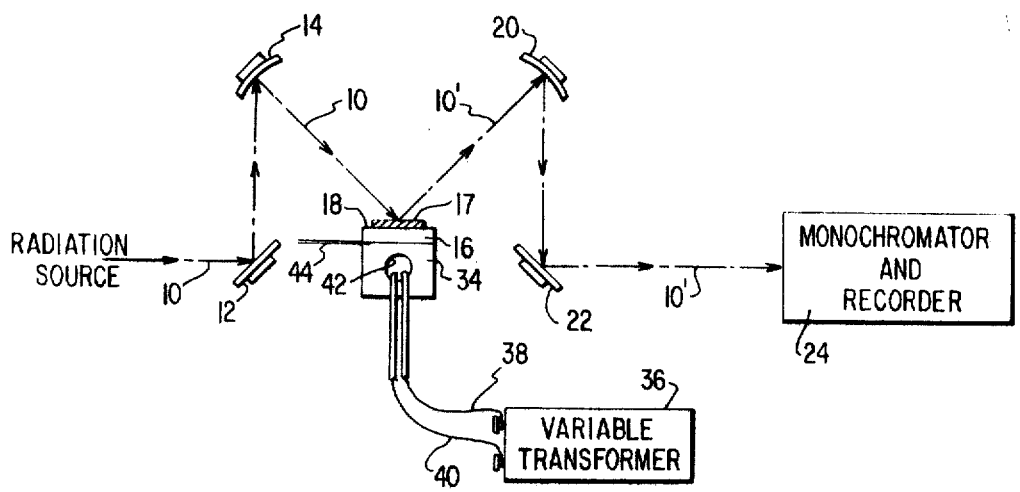

ABSTRACT OF THE DISCLOSURE

A new method and apparatus for determining the cure characteristics of curable materials are disclosed. Infrared radiation is passed through a sample of the material and reflected back through the sample by the reflective surface of the sample support means to sensing means which senses changes in the intensity of the beam. The absorption of the radiation is dependent on the nature and amount of material in the sample. The cure characteristics are determined by the absorption changes. Heating means are provided to heat the sample.

---

The present invention relates to an apparatus and process for the in situ study of "cure" characteristics of materials, and more particularly to the study of such characteristics by radiant energy through measuring the variations or changes in the infrared absorption spectrum during curing of the material.

In the past, the chemical functional groups formed and/or eliminated from a polymer during "curing" have been determined only by rather elaborate means. For example, a polymer of interest has been applied as a thin coating to pieces of tin strips which were then "cured" for various times at predetermined temperatures. The polymers were then removed from the strips by solvent, scraping or other means and subjected to analysis. This method has several obvious disadvantages such as flakes of metal from scraping appearing in the product, non-homogeneous samples, and the necessity for introducing solvents, as well as being time consuming.

To overcome the disadvantages of the aforegoing types of procedures, a system has now been developed for studying the "cure" characteristics of polymers in situ. The method involves the use of a heated, horizontal sampling stage wherein the plate which holds the sample is a reflecting surface. Briefly, a beam of radiation from a source is passed through the sample to the reflecting surface then again through the sample at least once. When a material which absorbs radiation of selected wave lengths is placed on the reflecting surface, the beam will lose energy at those wave lengths where the material absorbs owing to an interaction with the penetrating beam. This attenuated radiation, when measured and plotted as a function of wavelength, gives rise to an absorption spectrum characteristic of the material.

In this invention, a material to be studied is placed in the sampling stage and cured. The material is in general a curable material, e.g., a material capable of a polymerization-type reaction such as drying, cross-linking, polymerization, oxidation, etc. which is accomplished by heating or reaction over a period of time. During the curing reaction, the curable material is subjected to infrared light, e.g., over a band of wave lengths, and an infrared spectrum is obtained, for example, at various predetermined sample temperatures or at selected times at constant temperature. Cure studies are made without the introduction of foreign contamination and in relatively short times by recording the variance in infrared wave energy at selected wave lengths over a period of time. The sample can be scanned with radiation over a board range of wave lengths, or over several small increments thereof as is most desirable. Cure studies can also be made with a given wave length by recording the change in the peak or absorption of this wave length over a period of time. Since the same sample is used at all tempearures, the results can be on a quantitative basis.

The specific frequency or wave length at which the radiant energy is absorbed by the material sample is a characteristic of the structure of the material and the amount of radiant energy absorbed by the sample is directly related to the quantity of absorbing materials in the path of the radiation. Any wave length may be selected for the beam provided that a portion of the energy of the beam is absorbed by the sample. The structure of the sample will determine the amount of reflected energy at any wave length. Infrared radiation is particularly applicable to this method because substantially all organic compounds will absorb radiation at specific frequencies within this range. For example, a composition in which there are ingredients having ether linkages will absorb infrared radiation of from 8 to 9 microns wave length; epoxide groups will absorb infrared radiation of from 6.62 to 6.66 microns wave length; a chemical having carbonyl groups will absorb light having a wave length of about 5.7 to 6.0 microns. Characteristic wave length bands for various olefin types are set for in the following table.

|  | Microns |
|---|---|
| $R_1CH=CH_2$ | 10.0–10.1, 10.9–11.0 |
| $R_1CH=CHR_2$(trans) | 10.2–10.4 |
| $R_1R_2C=CH_2$ | 11.2–11.4 |
| $R_1R_2C=CHR_3$ | 11.9–12.4 |
| $R_1CH=CHR_2$(cis) | 13.7–14.8 |

Further, because of the carbon to hydrogen linkage present, almost all organic compounds will absorb infrared radiation having a wave length of from 3.3 to 3.5 microns. In general, the material in accordance with this invention is scanned using radiation having a wave length in the range of about 2 to 25 microns either using the entire band of wave lengths, an increment thereof or a single wave length depending upon the particular material being studied.

The sole figure in the accompanying drawing illustrates a schematic side elevational view of the optical apparatus for studying the "cure" characteristics of a material. As represented by line 10, a beam of infrared radiation is supplied from a source (not shown). The radiation beam 10 strikes a mirror 12 and is reflected to mirror 14. Mirrors 12 and 14 focus an image of the radiant source into the surface of sampling plate 16 which has a reflecting surface 18. The mirrors and plate 16 can, for example, be polished aluminum. Mirrors 20 and 22 collect and refocus the beam, as illustrated by beam 10', which is reflected from surface 18 after passage through a sample 17 arranged on plate 16. Beam 10' enters an IR monochromator and recorder 24 for measuring variations or changes in the intensity of the infrared beam. The sampling plate 16 is mounted on a heater 34 connected to a variable transformer 36 by wires 38 and 40. Heater 34 conveniently has a well 42 for the heater. A thermocouple 44 is arranged as shown. Each of the mirrors is preferably rotatably mounted since, in substituting sampling plates of different thickness, an adjustment of the angles of these mirrors may be required for focusing.

In operation, a sample 17, e.g., a film of the curable material is place on sample plate 16 and a beam 10 of infrared radition is directed through the optical path described above to determine the absorption pattern thereof, i.e., obtain a record of the variations in the intensity of beam 10' with respect to beam 10 over a range of wave lengths from about 2 to 25 microns. The intensity of beam 10 is, although not shown, according to conventional practice, also measured, e.g., by monochromator 24, to provide a reference beam. The reference beam bypasses the sample zone. Thereupon, when desired, heater 34 is operated to increase the temperature of the sample by applying a current from transformer 36. The "cure" characteristics of the sample material are continuously determined in relation to increasing temperatures by detecting the changes in the absorption at selected wave lengths of radiation beam 10 after it is passed through the sample by sensing the variations or changes in intensity of beam 10' and correlating these changes with respect to the known temperature. The temperature is measured by thermocouple 44 or a plot of temperature versus transformer output is prepared and the temperature determined thereby. The latter arrangement is especially desirable where it is desired to obtain an infrared spectrum at specific temperatures. To obtain the spectrum at each temperature level the sample is scanned with a beam 10 of radiation of from about 2 to 25 microns or with radiation at selected increments within this range. If desired, the sample can be constantly studied with a beam of radiation having a specific wave length at either a constant or a varying temperature to provide a time base scan of the variations in the absorption of this beam by the sample. The variation in intensity of the beam of radiation can be either an increase or a decrease depending upon whether the absorbing material is being formed or destroyed. In studying the polymerization of butadiene copolymers, butadiene-styrene, for example, the polymer will be studied for the presence of olefinic groups and since the polymerization occurs at such groups the radiation absorbed by such groups will decrease with the loss of such groups. Characteristic wave length bands to study for various olefin types are set forth above and are generally in the range of 10 to 15 microns. In studying the polymerization of SMA-epoxy type polymers a characteristic band to study is the 6.62 to 6.66 micron wave length band. Also, air blown, i.e., oxidized asphalt is a known roofing material during the preparation of which carbonyl groups are formed. A study of air blown asphalt at the characteristic wave lengths for carbonyl groups will show an increase in the absorption of the radiation with the formation of carbonyl groups. A characteristic band to study for air blown asphalt is the 5.7 to 6.0 microns wave length band.

It is claimed:

1. A method for studying the cure characteristics of curable materials comprising providing a sample of said material on a reflecting surface and curing said sample while passing infrared radiation through said sample during the curing thereof onto said reflecting surface whereupon said radiation is reflected back through said sample, and detecting changes in the absorption of said radiation by said sample after reflection thereof during the curing of the sample.

2. The method of claim 1 wherein said radiation has a wave length of from about 2 to 25 microns.

3. The method of claim 1 further including heating said sample and detecting said changes at preselected temperatures.

4. The method of claim 3 wherein at each of said preselected temperatures said sample is scanned with radiation from about 2 to 25 microns in wave length.

5. The method of claim 2 wherein said detection is at preselected times at constant temperature.

6. The method of claim 1 wherein said radiation has a single predetermined wave length and the intensity of the reflected radiation is continuously recorded.

7. Infrared reflection spectrophotometer apparatus for studying the cure characteristics of a curable material comprising a sample support means having a horizontal reflective surface for supporting a sample of said material and heating means for heating said surface and providing said surface with a controlled variable temperature, a source of infrared radiation, means for directing a beam or infrared radiation at an angle through said sample whereupon it is reflected back through the sample, and sensing means in the path of said reflected beam to sense changes in the intensity of said reflected beam.

8. Apparatus as defined in claim 7 wherein said heating means include an electric heater having a horizontal upper surface, said support means comprising a removable plate having a reflective surface arranged on said upper surface, a variable transformer for supplying a variable controlled current to said heater and means for determining the temperature of said supper surface.

References Cited

UNITED STATES PATENTS 3,187,557   6/1965   Holbourne _____ 73—17
3,131,557   5/1964   Hoy.

OTHER REFERENCES

"Journal of The Optical Society of America," Gryunak, vol. 55, No. 6, June 1965, pp. 625–628.

RALPH G. NILSON, Primary Examiner

A L. BIRCH, Assistant Examiner

U.S. Cl. X.R.

73—17; 356—51, 201